(12) United States Patent
Ito

(10) Patent No.: US 8,514,053 B2
(45) Date of Patent: Aug. 20, 2013

(54) ANTI-THEFT SYSTEM FOR VEHICLE, AND VEHICLE HAVING THE ANTI-THEFT SYSTEM

(75) Inventor: Sachio Ito, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 1340 days.

(21) Appl. No.: 11/773,671

(22) Filed: Jul. 5, 2007

(65) Prior Publication Data

US 2008/0012683 A1    Jan. 17, 2008

(30) Foreign Application Priority Data

Jul. 7, 2006  (JP) ................................ 2006-188174
Sep. 27, 2006 (JP) ................................ 2006-263347
Mar. 20, 2007 (JP) ................................ 2007-073484

(51) Int. Cl.
*G05B 19/00* (2006.01)
(52) U.S. Cl.
USPC ............... 340/5.22; 307/10.5; 340/426.14; 340/5.23; 340/5.61; 340/5.72
(58) Field of Classification Search
USPC ............. 307/9.1, 10.1–10.8, 10.5; 340/5.22, 340/5.61, 10.5, 5.72, 426.14, 5.23
See application file for complete search history.

(56) References Cited

U.S. PATENT DOCUMENTS

| | | | | |
|---|---|---|---|---|
| 4,930,011 A | * | 5/1990 | Kiewit | ............................ 725/10 |
| 5,619,191 A | * | 4/1997 | Lambropoulos et al. | .... 340/5.22 |
| 5,767,784 A | * | 6/1998 | Khamharn | ................... 340/5.23 |
| 5,933,090 A | * | 8/1999 | Christenson | ............... 340/12.29 |
| 5,937,065 A | * | 8/1999 | Simon et al. | .................. 380/262 |
| 6,650,228 B1 | * | 11/2003 | Vacherand et al. | ........ 340/10.33 |
| 6,992,587 B2 | * | 1/2006 | Maeda et al. | ............... 340/572.1 |
| 7,164,213 B2 | * | 1/2007 | Yoshimura et al. | .......... 307/10.2 |
| 2003/0146820 A1 | * | 8/2003 | Takamura et al. | ........... 340/5.28 |
| 2004/0075553 A1 | * | 4/2004 | Ono | ......................... 340/539.13 |
| 2005/0270138 A1 | * | 12/2005 | Ikeda | ............................ 340/5.23 |
| 2006/0103501 A1 | * | 5/2006 | Gilbert et al. | ................. 340/5.22 |
| 2008/0024267 A1 | * | 1/2008 | Jones et al. | .................... 340/5.1 |
| 2010/0005507 A1 | * | 1/2010 | Kishimoto | ....................... 726/2 |

FOREIGN PATENT DOCUMENTS

| | | |
|---|---|---|
| DE | 4333474 A1 | 2/1995 |
| EP | 1095827 A2 | 5/2001 |
| JP | 08-150898 | 6/1996 |

OTHER PUBLICATIONS

European search report for corresponding European application 07252600 lists the references above.

* cited by examiner

*Primary Examiner* — Brian Zimmerman
*Assistant Examiner* — An T Nguyen
(74) *Attorney, Agent, or Firm* — Rabin & Berdo, P.C.

(57) ABSTRACT

An anti-theft system for a vehicle that registers ID information at the time of replacement of a lock controller. A portable device, such as a key, has exclusive ID information. A lock controller locks or unlocks a control target device according to an authentication result of the portable device. An auxiliary controller transmits and receives data to and from the lock controller and stores the ID information of the portable device as backup data. The lock controller receives the ID information from the auxiliary controller, and transmits a response requiring signal for searching the portable device which has the ID information received from the auxiliary controller and is present within a predetermined detection range. Then, the lock controller stores the ID information of the portable device which has transmitted a response signal to the response requiring signal.

15 Claims, 8 Drawing Sheets

ANTI-THEFT SYSTEM FOR VEHICLE, AND VEHICLE HAVING THE ANTI-THEFT SYSTEM

RELATED APPLICATIONS

This application claims the benefit of priority under 35 USC 119 of Japanese patent application nos. 2006-188174, filed on Jul. 7, 2006; 2006-263347, filed on Sep. 27, 2006; and 2007-073484, filed on Mar. 20, 2007, which applications are hereby incorporated by reference in their entireties.

BACKGROUND OF THE INVENTION

1. Field of the Invention

The present invention relates to a robbery prevention system, and more particularly to technology for registering ID information of a portable device carried by a user of a vehicle having a robbery prevention system. Robbery prevention system as used herein may also mean an anti-theft system.

2. Description of Related Art

In recent years, an immobilizer system which authenticates a key inserted into a key cylinder based on ID information electronically provided for the key, and a so-called smart key system which authenticates a portable device carried by a user of a vehicle based on ID information wirelessly received from the portable device have been used as systems for securely preventing robbery of vehicles.

According to this type of robbery prevention system, a lock controller for authenticating the portable device or key stores ID information of the portable device or key in advance. However, when the lock controller must be replaced for trouble or other reasons, the ID information must be registered again on a new lock controller. For registration of ID information, a specialized registration device is usually connected with the lock controller, and the ID information is inputted from the registration device to the lock controller. Thus, a user of the robbery prevention system must seek a specialist having a registration device in order to replace the lock controller, which is unsatisfactory from the viewpoint of convenience.

For overcoming this drawback, the robbery prevention system of JP-A-8-150898 stores ID information in an engine controller as well as a lock controller. According to this system, ID information is transmitted from the engine controller to the lock controller at the time of replacement of the lock controller to register the ID information on the lock controller. Thus, no special registration device is needed.

However, the robbery prevention system of JP-A-8-150898 does not fully overcome the problem of inconvenience. In JP-A-8-150898, ID information identical to ID information of a key is transmitted from the engine controller to a new lock controller and stored therein when the key is inserted into a key cylinder after replacement of the previous lock controller. Thus, the key needs to be inserted into the key cylinder for registration of the ID information, which is a rather complicated and troublesome operation.

SUMMARY OF THE INVENTION

The invention has been developed to solve the above problems. The invention provides a robbery prevention system that simplifies registration of ID information at the time of replacement of a lock controller, and a vehicle having the robbery prevention system.

A robbery prevention system according to the invention includes a portable device that has ID information provided exclusively for the portable device. A lock controller has memory means that stores the ID information, and authenticates the portable device based on the ID information stored in the memory means and the ID information received from the portable device. The lock controller locks or unlocks a control target device according to the authentication result. An auxiliary controller transmits and receives data to and from the lock controller and stores the ID information of the portable device as backup data. The lock controller includes receiving means that receives the ID information from the auxiliary controller, and searching and storing means that transmits a response requiring signal for searching the portable device which has the ID information received by the receiving means from the auxiliary controller and is present within a predetermined detection range. The lock controller stores the ID information of the portable device that has transmitted a response signal to the response requiring signal in the memory means.

According to the robbery prevention system of the invention, the searching and storing means transmits the response requiring signal to search the portable device. Thus, registration of the portable device when the lock controller is replaced is facilitated. In one embodiment, the ID information is allocated to the portable device in advance. The invention may also include an operation device whose is restricted by the control target device. Operation of the operation device is restricted when the control target device is locked and is allowed when the control target device is unlocked.

According to an example of the robbery prevention system of the invention, the lock controller may also include detecting means that detects replacement of the lock controller. The searching and storing means stores the ID information of the portable device having transmitted the response signal to the response requiring signal at the time of replacement of the lock controller. Thus, registration of the portable device when the lock controller is replaced is further facilitated. In this example, the detecting means may judge that the lock controller has been replaced when the memory means of the lock controller does not have the ID information.

According to an example of the invention, the searching and storing means of the lock controller may store a predetermined number of ID information in the memory means. In this example, security for registration of the portable device is improved.

According to a further example of the invention, the auxiliary controller further includes backup renewing means that renews the ID information stored in the memory means of the auxiliary controller as backup data according to predetermined timing. In this example, new ID information can be registered on the lock controller when the lock controller is replaced with new one.

A vehicle having the robbery prevention system described above facilitates registration of the portable device that is necessary when the lock controller is replaced.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
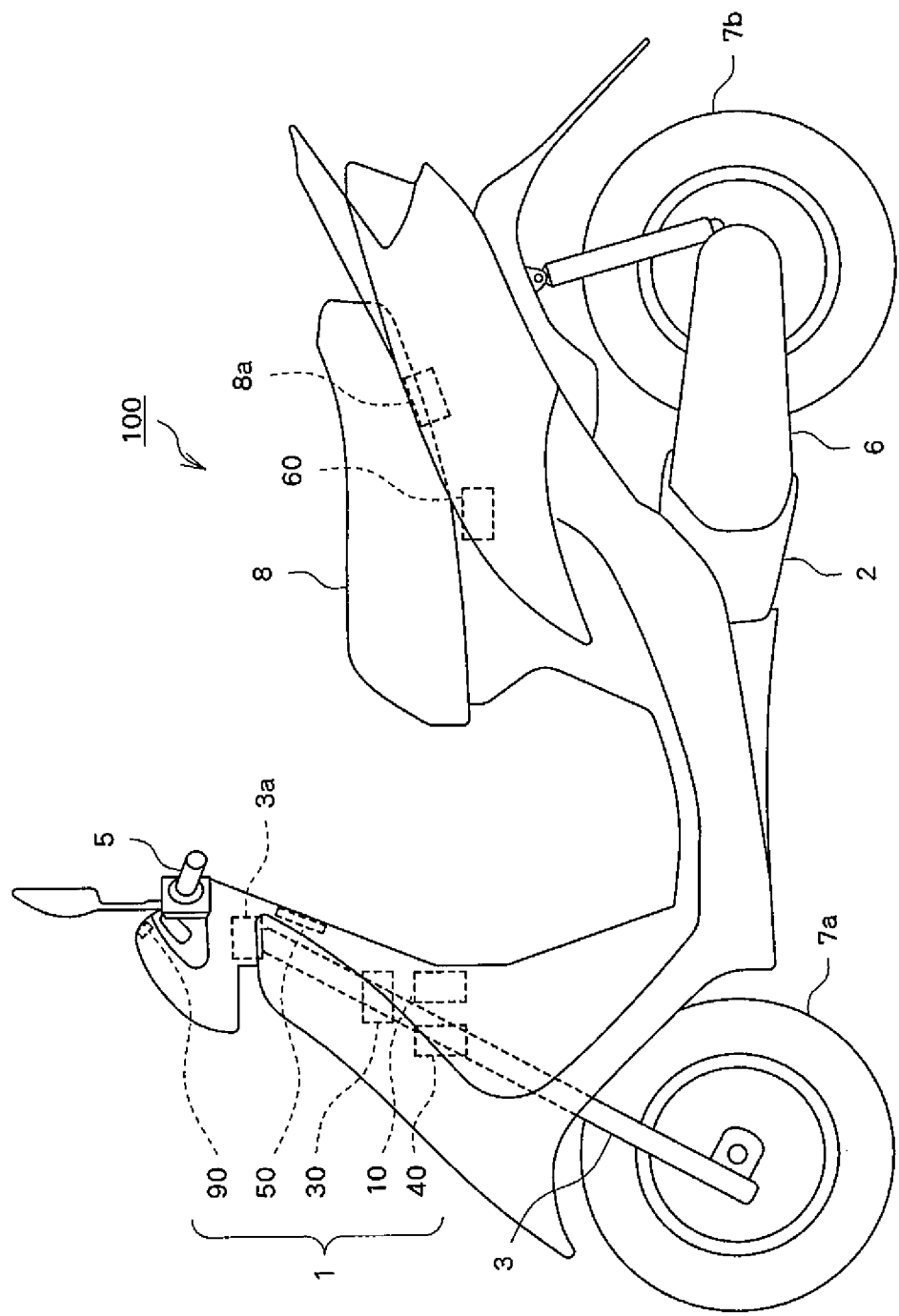
FIG. 1 is a side view of a motorcycle having a robbery prevention system in an embodiment according to the invention.
Figure 2:
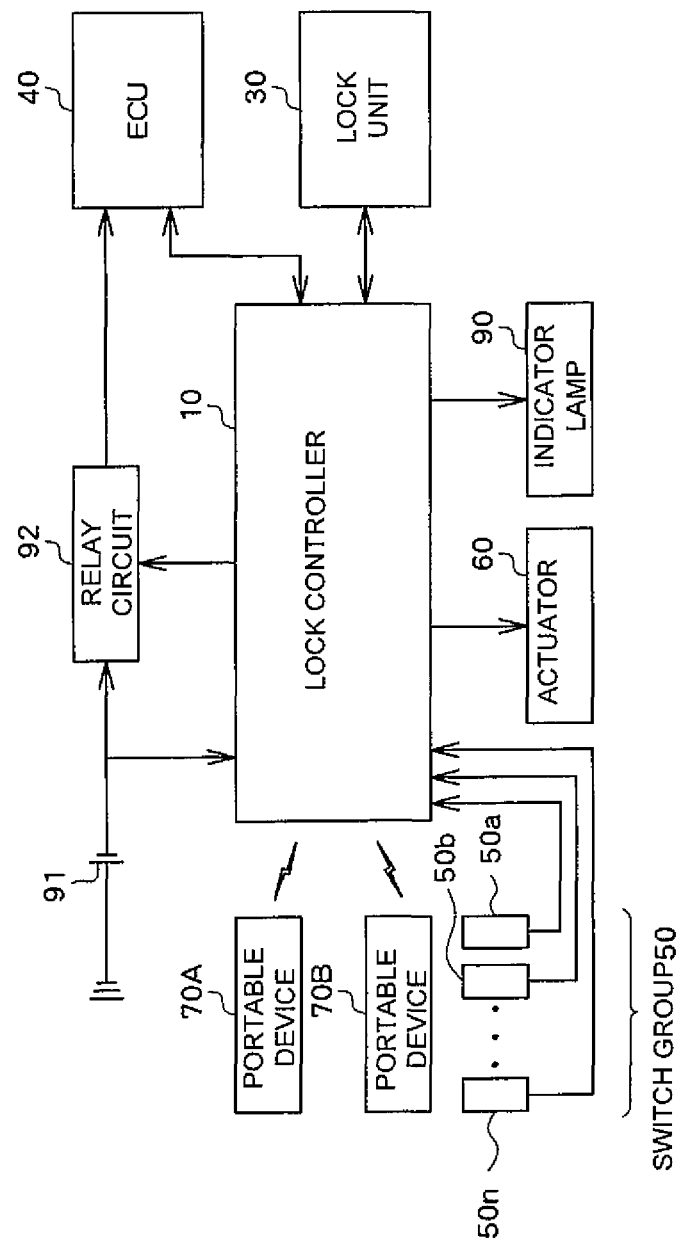
FIG. 2 is a block diagram of the robbery prevention system.

An embodiment according to the invention is hereinafter described with reference to the drawings. FIG. 1 is a side view of a motorcycle 100 including a robbery prevention system 1 in an embodiment according to the invention. FIG. 2 is a block diagram of robbery prevention system 1. As illustrated in FIG. 1, motorcycle 100 includes robbery prevention system 1, an actuator 60, an engine 2, and a steering shaft 3.

Steering shaft 3 extends diagonally downward, and has a handlebar 5 at the upper end and a front wheel 7a at the lower end. Steering shaft 3 is locked by a lock mechanism 3a in such a condition that rotation of steering shaft 3 is restricted when the vehicle is stopped. Engine 2 is disposed in the central lower region of the vehicle body, and the driving force of engine 2 is transmitted to a rear wheel 7b via a driving force transmission mechanism 6. An openable and closable seat 8 is disposed above engine 2, and a storage space (not shown) is provided below seat 8. A lock mechanism 8a is provided to restrict opening and closing of seat 8 when seat 8 is closed. Actuator 60 actuates lock mechanism 8a to restrict or allow opening and closing of seat 8. In one embodiment, actuator 60 is a solenoid valve that locks or unlocks a lock mechanism of a console box or the like.

As shown in FIG. 2, robbery prevention system 1 includes a lock controller 10, a lock unit (auxiliary controller) 30, an engine control unit (ECU) 40, a switch group 50 constituted by a plurality of switches, portable devices 70A and 70B, and an indicator lamp 90.

Indicator lamp 90 may be an LED (light emitting diode) provided on an instrument panel, for example. Indicator lamp 90 is turned on by power supplied from lock controller 10, and notifies a rider about errors or the like in processes performed by lock controller 10.

Switch group 50 includes a plurality of switches such as a starter switch 50a, a sensor-type switch 50b used by the rider to open and close the console box, and a sensor-type switch 50n to release the lock of seat 8. These switches transmit signals to lock controller 10 in accordance with switch operations performed by the user.

Lock controller 10 retains ID (identification) information provided exclusively for each of portable devices 70A and 70B (hereinafter referred to as portable device ID), and authenticates the portable device present within a predetermined detection range based on the portable device ID retained by lock controller 10 and the portable device ID received from the portable device present within the detection range. When the portable device is authenticated as a proper portable device, lock controller 10 locks or unlocks control target devices (lock mechanism 8a, lock mechanism 3a, and ECU 40 in this example) mounted on the vehicle. Motorcycle 100 has operation devices (steering shaft 3, seat 8, ECU 40 in this example), and operations of these operation devices are restricted by the control target devices when the control target devices are locked by lock controller 10. Operations of the operation devices are allowed when the control target devices are unlocked by lock controller 10 to release the restriction by the control target devices. For example, the opening and closing of seat 8 or rotation of steering shaft 3 is restricted when lock mechanism 8a or 3a is locked by lock controller 10, and the opening and closing of seat 8 or rotation of steering shaft 3 is allowed when lock mechanism 8a or 3a is unlocked by lock controller 10. ECU 40 is locked and the start of engine 2 is restricted when power supply to ECU 40 is cut off by lock controller 10. Engine 2 is allowed to start when power is supplied to ECU 40 by lock controller 10. The portable device IDs of portable devices 70A and 70B are information allocated to the corresponding portable devices in advance to identify the portable devices. The portable device IDs may be established for the portable devices in their manufacturing process, for example.

In this embodiment, it is assumed that lock controller 10 is a device newly mounted on the vehicle body after replacement of the previous lock controller, and does not have the portable device IDs of portable devices 70A and 70B in its initial condition. Lock controller 10 acquires the portable device IDs by processes that will be described later.

Lock unit 30 locks lock mechanism 3a to restrict rotation of steering shaft 3 and unlocks lock mechanism 3a to allow rotation of steering shaft 3 when portable device 70A or 70B is authenticated as the proper device from the result of the authentication process executed by lock controller 10. In this embodiment, lock unit 30 retains backup data of the portable device IDs stored in lock controller 10 and ID information provided exclusively for lock controller 10 (hereinafter referred to as lock controller ID). The lock controller ID is information allocated to lock controller 10 to distinguish lock controller 10 from other lock controllers mounted on other vehicle bodies. The lock controller ID may be established for the lock controllers in their manufacturing process, for example. In this embodiment, it is assumed that lock unit 30 is an auxiliary controller that retains backup data. Alternatively, however, ECU 40 may be used as the auxiliary controller.

ECU 40 controls the fuel injection quantity supplied for engine 2 and the injection timing by adjusting power supplied to an injector. When portable device 70A or 70B is authenticated as the proper device based on the result of the authentication process performed by lock controller 10 under the condition that starter switch 50a is turned on by the rider, power is supplied from a battery 91 to ECU 40 through a relay circuit 92. By this process, engine 2 is allowed to start.

Figure 3:
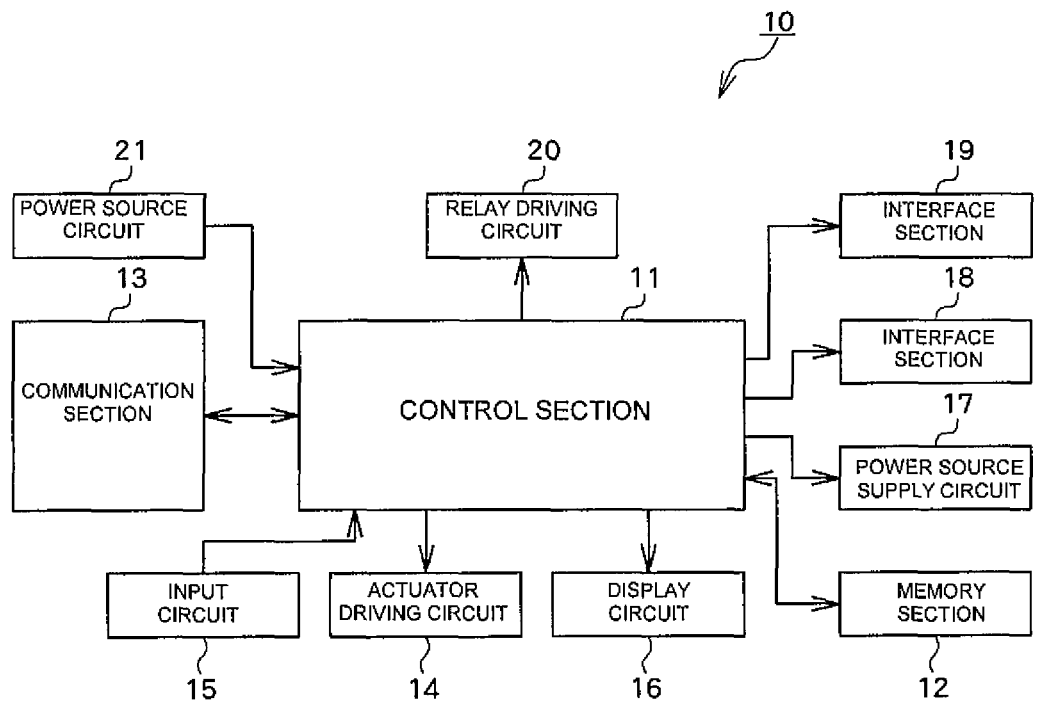
FIG. 3 is a block diagram of a lock controller included in the robbery prevention system.

The structures of lock controller 10, lock unit 30, and portable devices 70A and 70B are now described in detail. Initially, the structure of lock controller 10 is explained. FIG. 3 is a block diagram of lock controller 10, which includes a control section 11, a memory section 12, a communication section 13, an actuator driving circuit 14, an input circuit 15, a display circuit 16, a power source supply circuit 17, interface sections 18 and 19, a relay driving circuit 20, and a power source circuit 21.

Power source circuit 21 supplies power received from battery 91 to the components constituting lock controller 10. For sake of simplicity, FIG. 3 does not show all connection lines for connecting the components of controller 10 with power source circuit 21. Relay driving circuit 20 supplies or cuts off power to relay circuit 92 in response to a signal inputted from control section 11.

Power source supply circuit 17 supplies power received from battery 91 via power source circuit 21 to lock unit 30. Display circuit 16 supplies power to indicator lamp 90 in response to a signal inputted from control section 11. Input circuit 15 converts analog signals inputted through switches of switch group 50 into digital signals and outputs the converted signals to control section 11. Actuator driving circuit 14 supplies power to actuator 60 in response to a signal inputted from control section 11. Communication section 13 includes a wireless communication antenna. Communication section 13 converts and amplifies digital signals inputted from control section 11 into radio signals and transmits the radio signals. Communication section 13 also converts and amplifies radio signals received from portable devices 70A and 70B into digital signals, and outputs the digital signals to control section 11.

Interface section 19 outputs signals to ECU 40 based on commands issued from control section 11. Interface section 18 outputs signals to lock unit 30 based on commands issued from control section 11. For example, when the portable device is authenticated as a proper device based on the result of the authentication process for the portable device, signals indicating this fact are outputted from interface sections 18 and 19.

Control section 11 includes a CPU, and controls all components of lock controller 10 by executing programs stored in memory section 12. According to this embodiment, control section 11 executes processes such as acquiring the portable device IDs stored in lock unit 30 as backup data, and storing the portable device IDs in memory section 12 required when the new lock controller 10 is mounted on the vehicle body after replacement of the previous lock controller. The processes executed by control section 11 will be discussed in detail later.

Memory section 12 includes a readable and writable non-volatile memory, and stores programs to be executed by control section 11. According to this embodiment, the lock controller ID, the portable device IDs, and information indicating the number of the portable devices registered (hereinafter referred to as registration number information) are stored in memory section 12 by processes performed by control section 11.

Figure 4:
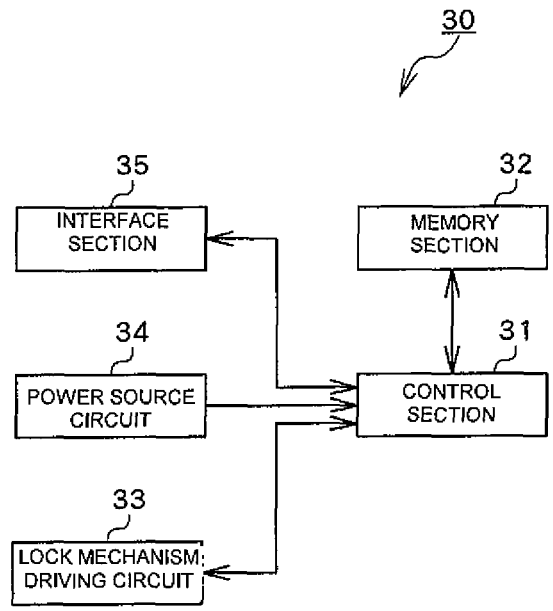
FIG. 4 is a block diagram of a lock unit included in the robbery prevention system.

Next, the structure of lock unit 30 is explained with reference to FIG. 4. As illustrated in FIG. 4, lock unit 30 includes a control section 31, a memory section 32, a lock mechanism driving circuit 33, a power source circuit 34, and an interface section 35.

Interface section 35 outputs signals received from interface section 18 of lock controller 10 to control section 31, and transmits signals to interface section 18 based on commands issued from control section 31. Power source circuit 34 supplies power received from power source supply circuit 17 of lock controller 10 to the respective parts of lock unit 30. For simplicity, FIG. 4 does not show connection lines for connecting the respective components with power source circuit 34. Lock mechanism driving circuit 33 supplies power to the actuator of lock mechanism 3a of steering shaft 3 in response to a signal inputted from control section 31.

Memory section 32 includes a readable and writable non-volatile memory, and retains programs to be executed by control section 31. Memory section 32 also retains the lock controller ID, the portable device IDs, and the registration number information as backup data. According to this embodiment, memory section 32 in the initial condition retains as backup data the portable device IDs and the like stored in the previous lock controller before its replacement.

Control section 31 includes a CPU, and controls all components of lock unit 30 by executing programs stored in memory section 32. For example, control section 31 performs processes for authorizing lock controller 10 based on the lock controller ID transmitted from lock controller 10, and renewing the backup data stored in memory section 32. In this embodiment, control section 31 transmits the backup data stored in memory section 32 to lock controller 10 at the time of registration of the portable device ID on lock controller 10. The processes executed by control section 31 will be described in detail later.

Figure 5:
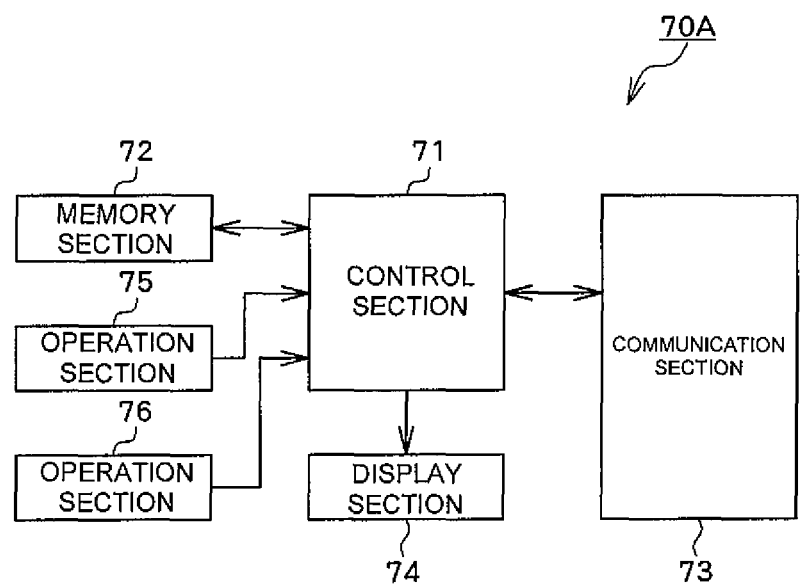
FIG. 5 is a block diagram of a portable device included in the robbery prevention system.

Next, the structures of portable devices 70A and 70B are discussed in detail. FIG. 5 is a block diagram of portable device 70A. As illustrated in FIG. 5, portable device 70A includes a control section 71, a memory section 72, a communication section 73, a display section 74, and operation sections 75 and 76. Portable device 70B has a structure similar to that of portable device 70A, and thus detailed explanation of portable device 70B is not repeated herein.

Operation sections 75 and 76 are switches that are operated by the rider, and that output signals to control section 71 in accordance with the operation by the rider. Display section 74 may be an LED, for example, that is turned on in response to a signal outputted from control section 71. Communication section 73 includes a wireless communication antenna. Communication section 73 converts and amplifies digital signals inputted from control section 71 into radio signals and transmits the radio signals. Communication section 73 also converts and amplifies the radio signals received from lock controller 10 into digital signals and outputs the digital signals to control section 71.

Memory section 72 includes a readable and writable non-volatile memory, and retains programs to be executed by control section 71. Memory section 72 also stores portable device IDs provided exclusively and in advance for each portable device.

Control section 71 including a CPU executes programs stored in memory section 72, and controls all components of portable device 70. The processes performed by control section 71 will be discussed in detail later.

Figure 6:
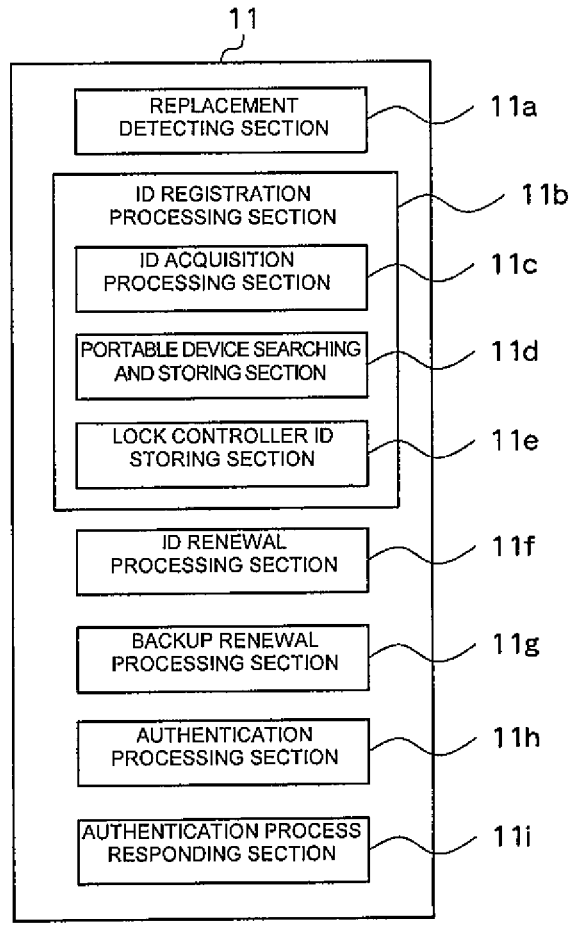
FIG. 6 is a function block diagram showing processes executed by a control section of the lock controller.

The processes executed by control section 11 of lock controller 10 are now explained in detail. FIG. 6 is a function block diagram of control section 11. As shown in FIG. 6, control section 11 includes a replacement detecting section 11a, an ID registration processing section 11b, an ID renewal processing section 11f, a backup renewal processing section 11g, an authentication processing section 11h, and an authentication process responding section 11i. ID registration processing section 11b functions when a new lock controller 10 is mounted on the vehicle body after replacement of a previous lock controller. ID renewal processing section 11f, backup renewal processing section 11g, authentication processing section 11h, and authentication process responding section 11i function under ordinary conditions after the process executed by ID registration processing section 11b is completed.

Replacement detecting section 11a detects a condition where lock controller 10 has been replaced with a new lock controller. Replacement detecting section 11a detects the replacement of the lock controller, for example, by searching for a portable device ID in memory section 12 of lock controller 10, and judging that replacement of the lock controller has occurred when no portable device ID is detected.

At the manufacturing stage of lock controller 10, information that lock controller 10 is in the initial condition, that is, that no portable device ID has been stored in memory section 12 yet (non registration information), is stored in memory section 12 in advance. Replacement detecting section 11a searches the non registration information in the memory area of memory section 12, and judges that a new lock controller 10 has been mounted on the vehicle body when the non registration information is detected. Alternatively, replacement detecting section 11a may judge that a new lock controller 10 has been mounted on the vehicle body based on a signal inputted from switch group 50 by a predetermined switch operation executed by the operator.

When replacement of lock controller 10 is detected, ID registration processing section 11b executes a re-storing process for acquiring the portable device IDs from lock unit 30 and storing the portable device IDs in memory section 12. ID registration processing section 11b includes an ID acquisition processing section 11c, a portable device searching and storing section 11d, and a lock controller ID storing section 11e.

ID acquisition processing section 11c acquires the portable device IDs and lock controller ID. More specifically, ID acquisition processing section 11c transmits a requirement signal for requiring transmission of the portable device IDs and the lock controller ID retained by lock unit 30 as backup data to lock unit 30. Then, ID acquisition processing section 11c receives the portable device IDs and the lock controller ID transmitted from lock unit 30 in response to the requirement signal.

Portable device searching and storing section 11d transmits a response requiring signal for searching portable devices that have the portable device IDs received from lock unit 30 (i.e. portable devices 70A and 70B) and are present within a predetermined detection range of lock controller 10 (such as an area of several meters). When response signals to the response requiring signal are received from portable devices 70A and 70B, the portable device IDs of the portable devices having transmitted the response signals are stored in memory section 12. Portable device searching and storing section 11d may register all the portable devices which have the portable device IDs stored in lock unit 30 and have transmitted the response signals, or may register only a predetermined number of the portable devices.

Lock controller ID storing section 11e stores the lock controller ID acquired by ID acquisition processing section 11c from lock unit 30 in memory section 12. By this process, lock controller 10 obtains the lock controller ID of the previous lock controller mounted on the vehicle body before replacement.

At the time of new registration of a portable device, ID renewal processing section 11f stores the portable device ID of this portable device in memory section 12. More specifically, when a predetermined switch operation (hereinafter referred to as a first operation) is initially performed by the operator, ID renewal processing section 11f transmits a requirement signal for requiring portable device ID to a portable device not yet registered and present in the predetermined detection range. Then, ID renewal processing section 11f receives the portable device ID transmitted from the portable device in response to the requirement signal. When a predetermined switch operation different from the first operation (hereinafter referred to as a second operation) is performed, the portable device IDs having been stored in memory section 12 are deleted and thereafter the portable device ID of the unregistered portable device is stored in memory section 12. When a predetermined switch operation different from the second operation is performed, the portable device ID of the unregistered portable device is added to the registered portable device IDs and stored in memory section 12. When the number of the portable device IDs stored in memory section 12 changes after renewal of the portable device IDs, ID renewal processing section 11f further renews the registration number information.

Backup renewal processing section 11g renews backup data retained by lock unit 30 in accordance with predetermined timing. The predetermined timing includes the time when start switch 50a is turned on by the rider, when new portable device ID is registered by ID renewal processing section 11f, when predetermined time elapses from the previous renewal of the backup data, and other timing. The backup data renewed by backup renewal processing section 11g is supplied for the re-storing process of the portable device ID to be executed later. The renewal process of the backup data is performed by the following method, for example.

Backup renewal processing section 11g acquires the portable device IDs and the registration number information (hereinafter abbreviated as portable device information) stored as backup data from lock unit 30. Then, backup renewal processing section 11g compares the acquired portable device information and the portable device information stored in memory section 12, and transmits the portable device information in memory section 12 to lock unit 30 when the information does not coincide with the other information (for example, when new portable device ID is added by ID renewal processing section 11f). Then, lock unit 30 retains the received portable device information as backup data.

Authentication processing section 11h authenticates a portable device present within the detection range when a predetermined switch contained in switch group 50 (start switch 50a, for example) is turned on. When it is determined that this portable device is a proper portable device portable device 70A or 70B in this embodiment) based on the authentication, authentication processing section 11h unlocks or locks the control target devices. For example, authentication processing section 11h transmits a signal indicating the judgment result to lock unit 30 to release the locked condition of lock mechanism 3a and allow rotation of steering shaft 3. Also, authentication processing section 11h turns on relay circuit 92 and supplies power to ECU 40 to release the locked condition of ECU 40 and bring engine 2 into the starting condition. Furthermore, authentication processing section 11h actuates actuator 60 to release the locked condition of lock mechanism 8a and thereby allow the opening and closing of seat 8.

The authentication process performed by authentication processing section 11h may be a challenge and response method, for example. According to this method, authentication processing section 11h transmits the lock controller ID of lock controller 10 and challenge data. Authentication processing section 11h calculates response data from the challenge data and the portable device ID stored in memory section 12. When portable device 70A or 70B having received the challenge data calculates response data from the challenge data and portable device ID and transmits the response data to lock controller 10, authentication processing section 11h compares the received response data and the response data previously calculated, When the response data coincides with the other response data, it is judged that the portable device having transmitted the response data has been already registered and therefore is a proper portable device. Other methods of authentication such as plain text authentication may also be used.

Authentication process responding section 11*i* responds to a signal transmitted from lock unit 30 in the authentication process for authenticating lock controller 10 by lock unit 30. For example, when lock unit 30 transmits a signal for requiring the lock controller ID, authentication process responding section 11*i* reads the lock controller ID from memory section 12 and transmits the lock controller ID to lock unit 30 in response to the signal. When the authentication process performed by lock unit 30 uses the challenge and response method, authentication process responding section 11*i* creates response data from the challenge data received from lock unit 30 and the lock controller ID, and transmits the response data to lock unit 30.

Figure 7:
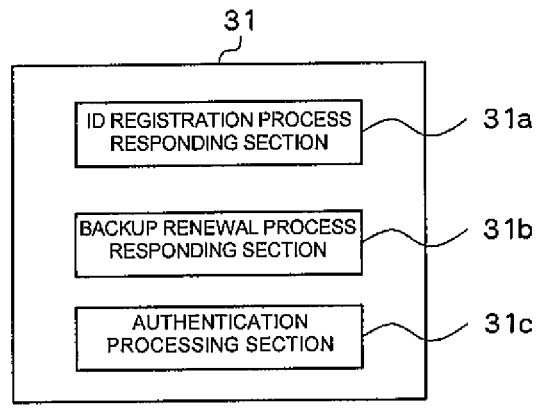
FIG. 7 is a function block diagram showing processes executed by a control section of the lock unit.

The process executed by control section 31 of lock unit 30 is now explained. FIG. 7 is a function block diagram of control section 31. As illustrated in FIG. 7, control section 31 includes an ID registration process responding section 31*a*, a backup renewal process responding section 31*b*, and an authentication processing section 31*c* as functional divisions.

ID registration process responding section 31*a* responds to a signal transmitted from lock controller 10 in the portable device ID re-storing process discussed above. More specifically, when receiving a requirement signal requiring the portable device IDs and the lock controller ID from lock controller 10, ID registration process responding section 31*a* reads the portable device IDs and the lock controller ID from memory section 32 and transmits these IDs to lock controller 10 in response to the requirement signal.

ID registration process responding section 31*a* may encode the portable device IDs and the lock controller ID before transmission. The encoding method may be an open key encoding method, for example. In this case, lock controller 10 retains secret key data in advance. ID registration process responding section 31*a* acquires open key data from lock controller 10, encodes the portable device IDs and the lock controller ID using the open key data, and transmits the encoded IDs to lock controller 10. Lock controller 10 decodes the signals transmitted from ID registration process responding section 31*a* according to the secret key data to acquire the portable device IDs or the like. The encoding method may also be a secret key encoding method.

Backup renewal process responding section 31*b* responds to a signal transmitted from lock controller 10 in the renewal process performed by backup renewal processing section 11*g* discussed above. For example, when the backup data is required by lock controller 10, backup renewal process responding section 31*b* transmits the portable device information stored in memory section 32 in response to the requirement. When portable device information is received from lock controller 10 in the later process, the newly received portable device information is overwritten on the portable device information in memory section 32 as new backup data.

Authentication processing section 31*c* authenticates lock controller 10 based on the lock controller ID. This authentication process is performed when start switch 50*a* is turned on, when the portable device is authorized as a proper portable device based on the result of authentication process for the portable device executed by lock controller 10 under the condition where start switch 50*a* is turned on, and on other occasions, for example.

The authentication process executed by authentication processing section 31*c* may be the challenge and response method discussed above, for example. According to this method, authentication processing section 31*c* creates challenge data and transmits the data to lock controller 10. Simultaneously, authentication processing section 31*c* calculates response data from the challenge data and the lock controller ID stored in memory section 32 in advance. On the other hand, authentication process responding section 11*i* of lock controller 10 creates response data from the received challenge data and the lock controller ID stored in memory section 12 and transmits the data to lock unit 30. Authentication processing section 31*c* compares the response data received from lock controller 10 and the response data previously calculated, and judges that lock controller 10 is a proper device when the response data coincides with the other response data.

Figure 8:
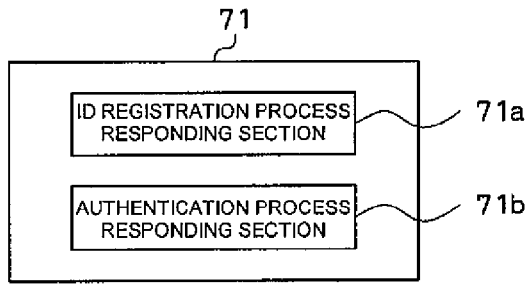
FIG. 8 is a function block diagram showing processes executed by a control section of the portable device.

The process performed by control section 71 of portable devices 70A and 70B is now explained. FIG. 8 is a function block diagram of control section 71. As illustrated in FIG. 8, control section 71 includes an ID registration process responding section 71*a*, and an authentication process responding section 71*b* as functional divisions.

ID registration process responding section 71*a* responds to a signal received from lock controller 10 in the portable device ID re-storing process performed by lock controller 10. More specifically, when receiving a response requiring signal from lock controller 10, ID registration process responding section 71*a* transmits a response signal to lock controller 10. In this case, ID registration process responding section 71*a* may transmit the response signal when receiving the response requiring signal, or may transmit the response signal when a predetermined signal is inputted through operation sections 75 and 76 after receipt of the response requiring signal and execution of a predetermined switch operation by the operator.

Authentication process responding section 71*b* responds to a signal received from lock controller 10 in the authentication process performed by lock controller 10. For example, when the authentication process method is the challenge and response method, authentication process responding section 71*b* creates response data from the challenge data received from lock controller 10 and the portable device ID stored in memory section 72 and transmits the response data to lock controller 10.

Figure 9:
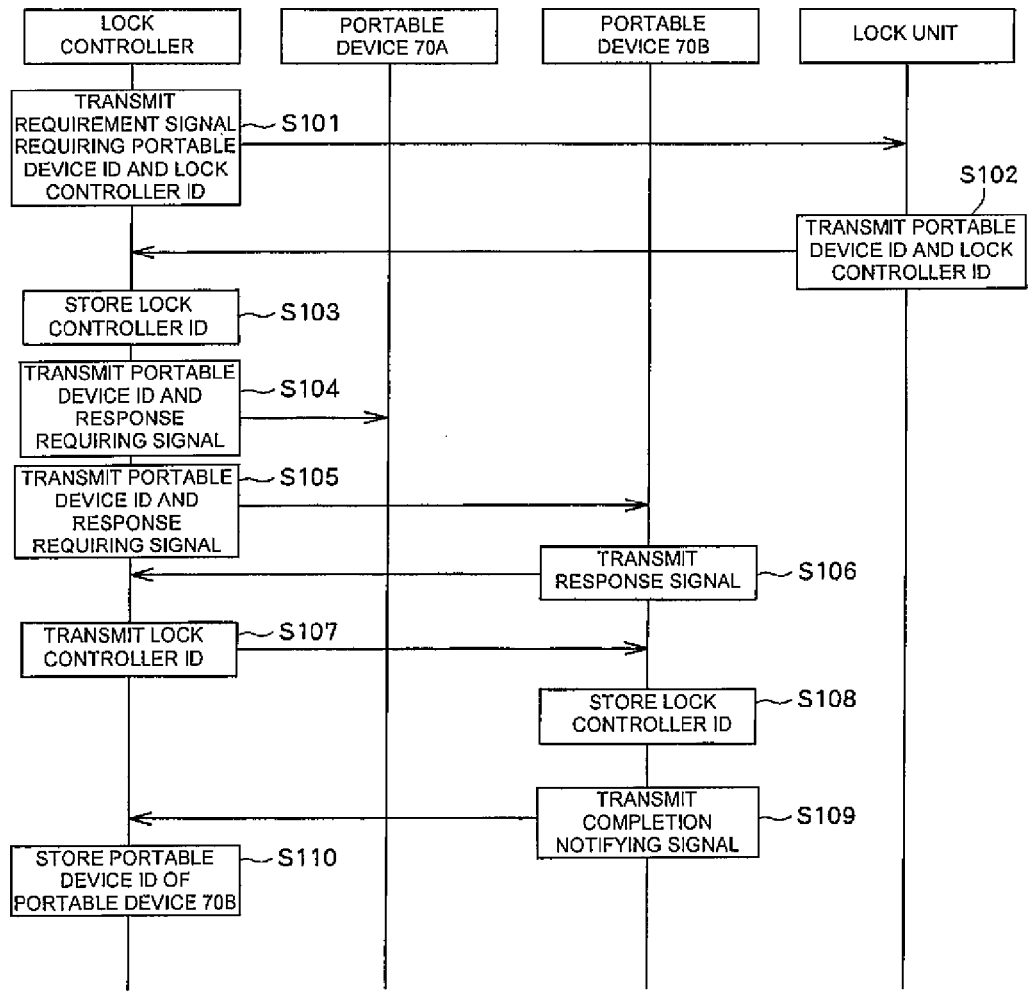
FIG. 9 is a sequence diagram showing an example of a re-storing process executed when the lock controller is replaced with new one.
Figure 10:
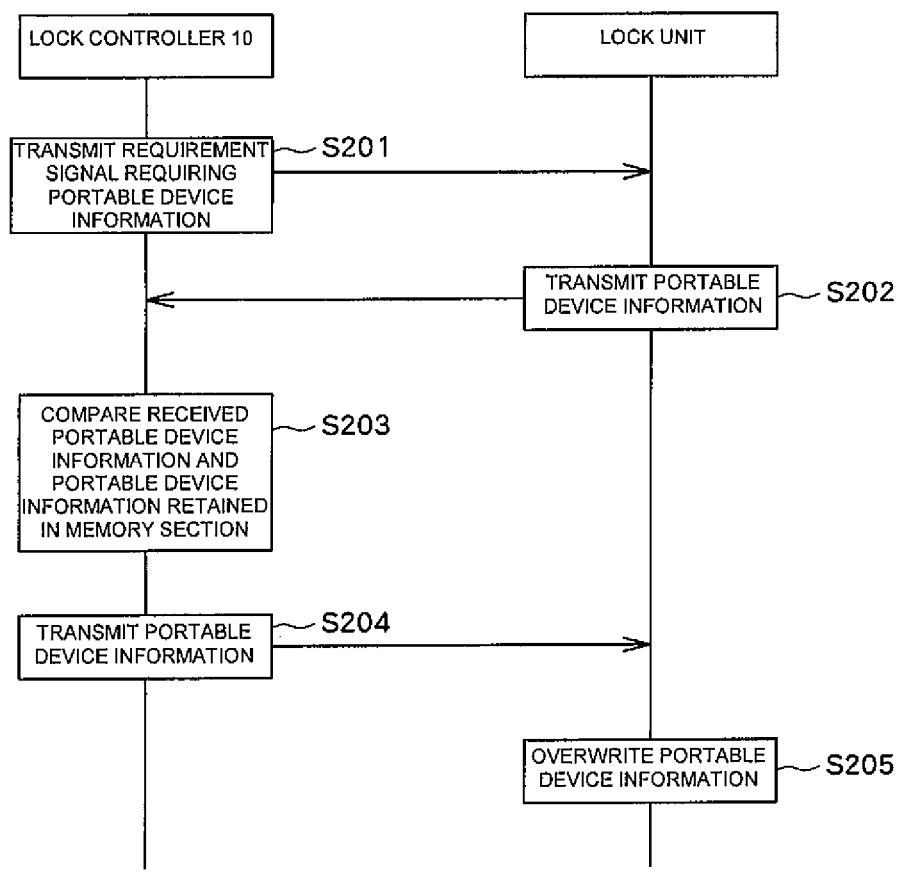
FIG. 10 is a sequence diagram showing an example of a process for renewing backup data retained by the lock unit.

The processes performed by robbery prevention system 1 are now discussed with reference to sequence figures of FIGS. 9 and 10. FIG. 9 shows an example of the portable device ID re-storing process. FIG. 10 shows an example of the backup data renewal process. Initially, the re-storing process is explained. In the following description, it is assumed that only portable device 70B is present within the detection range of lock controller 10, and that portable device 70A is absent from the detection range.

When replacement detecting section 11*a* judges that a new lock controller 10 has been attached to the vehicle body, ID acquisition processing section 11*c* transmits a requirement signal requiring the portable device IDs and the lock controller ID to lock unit 30 (S101). ID registration process responding section 31*a* of lock unit 30, having received the requirement signal, reads the portable device IDs of portable devices 70A and 70B and the lock controller ID stored in memory section 32 as backup data, and transmits these IDs to lock controller 10 (S102).

Lock controller ID storing section 11*e* of lock controller 10 stores the lock controller ID acquired from lock unit 30 in storage section 12 (S103). Portable device searching and storing section 11*d* selects one of the plural portable device IDs received from lock unit 30 portable device 70A in this case), and transmits the selected portable device ID and a response requiring signal (S104). Since portable device 70A is not present within the detection range, it does not receive the response requiring signal, and lock controller 10 therefore does not receive a response signal from portable device 70A.

Then, portable device searching and storing section 11d selects, from among the plural portable device IDs received from lock unit 30, a portable device ID (portable device ID of portable device 70B) that is different from the portable device ID previously selected (portable device ID of portable device 70A), and transmits the selected portable device ID and a response requiring signal (S105). In this example, since portable device 70B is present within the detection range, portable device 70B receives the portable device ID and the response requiring signal. Registration process responding section 71a of portable device 70B compares the received portable device ID and the portable device ID of portable device 70B stored in memory section 72, and transmits a response signal to lock controller 10 after confirming that the response requiring signal has been addressed to portable device 70B (S106).

Portable device searching and storing section 11d of lock controller 10, having received the response signal, reads the lock controller ID from memory section 12, and transmits the lock controller ID to portable device 70B (S107). In this step, portable device searching and storing section 11d may transmit the portable device ID of portable device 70B as well as lock controller ID. Then, ID registration process responding section 71a of portable device 70B may judge that the lock controller ID has been transmitted to portable device 70B based on the portable device ID transmitted from portable device searching and storing section 11a.

ID registration process responding section 71a of portable device 70B stores the received lock controller ID in memory section 72 (S108), and transmits a completion notifying signal indicating this fact to lock controller 10 (S109). When receiving the completion notifying signal, portable device searching and storing section 11d stores the portable device ID of portable device 70B in memory section 12 (S110). In this step, portable device searching and storing section 11d may store registration number information indicating the number of the stored portable device IDs ("1" in this example) in memory section 12.

Before execution of the process in S101, lock unit 30 may authenticate lock controller 10 based on manufacturer information stored in memory section 12 during manufacture of lock controller 10 to indicate that lock controller 10 is a proper device. When lock controller 10 is authenticated as a proper device, lock unit 30 may transmit a signal indicating this fact to lock controller 10, and then lock controller 10 may transmit the requirement signal in S101.

Next, the renewal process of the backup data is discussed with reference to FIG. 10. In the following description, it is assumed that the portable device ID stored in memory section 12 has been changed by the process performed by renewal processing section 11f of lock controller 10 prior to the start of the renewal process.

Backup renewal processing section 11g of lock controller 10 transmits a requirement signal requiring transmission of the portable device information stored as backup data to lock unit 30 when start switch 50a is turned on by the rider, for example (S201). When receiving the requirement signal, backup renewal process responding section 31b of lock unit 30 transmits the portable device information stored in memory section 32 as backup data to lock controller 10 (S202). Backup renewal processing section 11g compares the received portable device information and the portable device information stored in memory section 12 (S203). In this example, since the portable device ID in memory section 12 has been changed before the renewal process, the portable device ID does not coincide with the other portable device ID. Thus, backup renewal processing section 11g transmits the portable device information in memory section 12 to lock unit 30 (S204). When receiving the portable device information from lock controller 10, backup renewal process responding section 31b overwrites the newly received portable device information on the portable device information stored in memory section 32 to obtain new backup data (S205). Backup renewal process responding section 31b may then transmit a signal indicating completion of the renewal process of the backup data to lock controller 10.

Comparison of the backup data prior to renewal retained by memory section 32 and the portable device information retained by lock controller 10 may also be performed by lock unit 30. In this case, backup renewal processing section 11g transmits the portable device information stored in memory section 12 to lock unit 30 according to predetermined timing. Backup renewal process responding section 31b compares the portable device information received from lock controller 10 and the portable device information stored in memory section 32 as backup data. When the portable device information does not coincide with the other portable device information, the newly received portable device information is overwritten on the stored portable device information.

Figure 11:
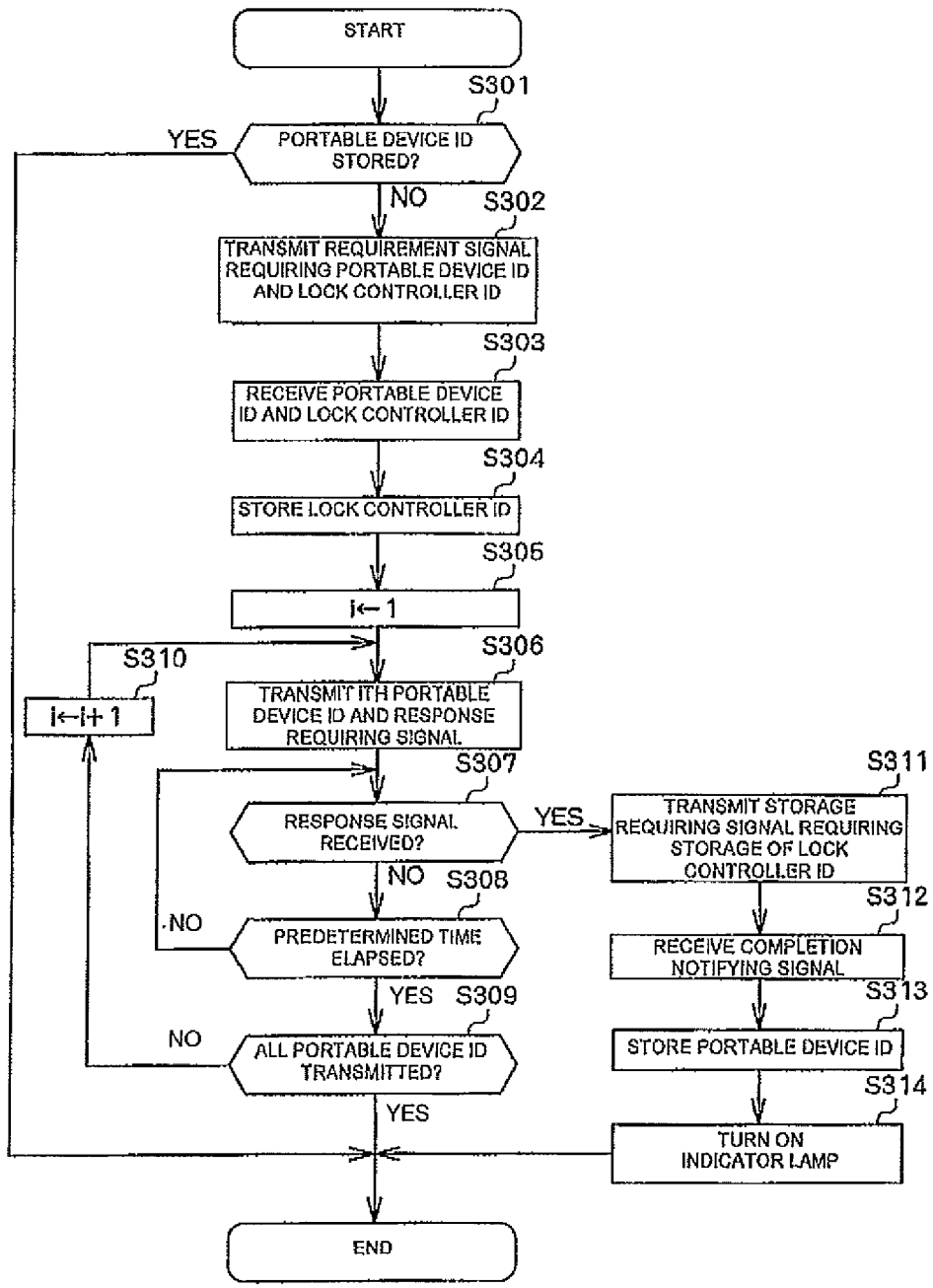
FIG. 11 is a flowchart showing an example of a re-storing process executed by the control section of the lock controller when the lock controller is replaced with new one.

The re-storing process performed by replacement detecting section 11a and ID registration processing section 11b is now explained in more detail. FIG. 11 is a flowchart showing the flow of the processes executed by replacement detecting section 11a and ID registration processing section 11b. In this example, it is assumed that only one portable device ID is stored in memory section 12 at the time of the re-storing of the portable device ID. It is also assumed that memory section 32 of lock unit 30 retains an ID table sequentially storing a plurality of portable device IDs.

Initially, replacement detecting section 11a searches the memory area of memory section 12 to judge whether the portable device ID has been stored (S301). When it is determined that the portable device ID has been already stored, the process ends.

When it is judged that the portable device ID has not been stored, ID acquisition processing section 11c transmits a requirement signal requiring transmission of the portable device IDs and the lock controller ID to lock unit 30 (S302), and acquires a plurality of portable device IDs and the lock controller ID returned from lock unit 30 (S303). As discussed above, the portable device IDs may be stored and transmitted in the form of an ID table.

Then, lock controller ID storing section 11e stores the lock controller ID in memory section 12 (S304). Portable device searching and storing section 11d establishes parameter i as initial value 1 (S305), and transmits the portable device ID stored ith in the ID table and a response requiring signal (S306). Portable device searching and storing section 11d then judges whether a response signal has been received from the portable device retaining the portable device ID transmitted in S306 (S307). When it is determined that the response signal has not been received yet, portable device searching and storing section 11d judges whether predetermined time has elapsed from the time of transmission of the response requiring signal (S308). When it is determined that the predetermined time has not elapsed yet, the process returns to S107 and portable device searching and storing section 11d again judges whether the response signal has been received.

When it is determined that the predetermined time has elapsed in S308, portable device searching and storing section 11d judges whether the response requiring signal has been transmitted to all the portable devices retaining the portable device IDs stored in the ID table (portable devices 70A and 70B in this example)(S309). When it is determined that the response requiring signal has been already transmitted to all the portable devices, it is judged that portable devices 70A and 70B are not present within the detection range and the re-storing process of the portable device ID ends. In this process, portable device searching and storing section 11d may turn on indicator lamp 90 to notify the operator that the re-storing of the portable device ID has not been completed, for example.

When it is determined that the response requirement signal has not been transmitted to all of the portable device IDs yet in S309, portable device searching and storing section 11d increments the parameter i by one (S310) and the process returns to S306. Then, portable device searching and storing section 11d again transmits the portable device ID stored ith in the ID table and the response requiring signal.

When it is determined that the response signal has been received from portable device 70A or 70B in S307, portable device searching and storing section 11d transmits the portable device ID of the portable device 70A or 70B having transmitted this response signal and a storage requiring signal requiring storage of the lock controller ID in memory section 72 (S311). Then, portable device searching and storing section 11d receives a completion notifying signal indicating that the lock controller ID has been stored in memory section 72 in response to the storage requiring signal from portable device 70A or 70B (S312). Also, portable device searching and storing section 11d stores the portable device ID of portable device 70A or 70B having transmitted the response signal in memory section 12 (S313). Then, portable device searching and storing section 11d turns on indicator lamp 90 in a predetermined manner to notify this fact to the operator (S314).

According to the robbery prevention system described above, replacement detecting section 11a of control section 11 detects replacement of lock controller 10 with new one. In this process, ID registration processing section 11b searches the portable device present within the predetermined detection range, and stores the portable device ID of this portable device in memory section 12. Thus, the re-registration of the portable device ID needed when the lock controller is replaced is facilitated.

The particular embodiments of the invention described in this document should be considered illustrative, rather than restrictive. Modification to the described embodiments may be made without departing from the spirit of the invention as defined by the following claims.

The invention claimed is:

1. An anti-theft system, comprising:
a first portable device that stores a first portable device ID which is provided exclusively for the first portable device;
a lock controller that includes memory means for storing portable device IDs that correspond to portable devices; and
an auxiliary controller that transmits and receives data to and from the lock controller and stores a plurality of portable device IDs, including the first portable device ID as backup data,
wherein the lock controller includes:
first receiving means that receives the plurality of portable device IDs from the auxiliary controller, and
transmitting means that transmits a requiring signal, that includes the first portable device ID included in the plurality of portable device IDs received by the first receiving means from the auxiliary controller, for searching for the first portable device, the first portable device includes:
a receiver for receiving the requiring signal,
a comparator that compares the first portable device ID received in the requiring signal and the first portable device ID stored in the first portable device to confirm that the requiring signal has been addressed to the first portable device, and
a transmitter that transmits a response signal after the comparator confirms that the requiring signal has been addressed to the first portable device,
the lock controller further includes:
a second receiving means that receives the response signal transmitted by the first portable device,
a storing means that stores the first portable device ID, in response to the second receiving means receiving the transmitted response signal, in the memory means, and
an authentication processing section that authenticates the first portable device based on the first portable device ID stored in the memory means and another signal received from the first portable device that includes the first portable device ID, and locks or unlocks a control target device according to the result of the authentication.

2. The anti-theft system according to claim 1, wherein the first portable device ID is allocated to the first portable device in advance.

3. The anti-theft system according to claim 1, and further comprising an operation device, wherein the control target device restricts operation of the operation device, and
operation of the operation device is restricted when the control target device is locked and allowed when the control target device is unlocked.

4. The anti-theft system according to claim 1, wherein:
the lock controller further includes detecting means that detects replacement of the lock controller and receives the plurality of portable device IDs from the auxiliary controller when replacement is detected.

5. The anti-theft system according to claim 4, wherein the detecting means judges that the lock controller has been replaced when the memory means of the lock controller does not have the first portable device ID.

6. The anti-theft system according to claim 1, wherein the storing means of the lock controller stores a predetermined number of portable device IDs in the memory means.

7. The anti-theft system according to claim 1, wherein the auxiliary controller further includes backup renewing means that renews the plurality of portable device IDs and stores the plurality of portable device IDs in a memory means of the auxiliary controller as the backup data according to a predetermined timing.

8. A vehicle comprising the anti-theft system according to claim 1.

9. A method for registering ID information in a replacement lock controller of a vehicle anti-theft system, comprising:
judging that a replacement lock controller has been attached to the vehicle;
obtaining at the replacement lock controller a plurality of portable device IDs and a lock controller ID stored as backup data in an auxiliary lock unit;
storing the obtained lock controller ID in the replacement lock controller;
identifying portable devices that have IDs corresponding to those obtained from the auxiliary lock unit and that are within communication range of the replacement lock controller by transmitting, from the replacement lock controller, a requiring signal for each obtained portable device ID, each requiring signal including the corresponding obtained portable device ID, for each portable device that is within the communication range, receiving at the portable device the requiring signals, and for each received requiring signal, determining if the obtained portable device ID included in the requiring signal corresponds to the ID of the portable device and transmitting a response signal when the obtained portable device ID in the requiring signal is determined to correspond to the ID of the portable device, and determining if in response to each of the requiring signals a response signal that is transmitted by a portable device which has the portable device ID is received; and storing the IDs of the identified portable devices in the replacement lock controller.

10. The method according to claim 9, wherein the replacement lock controller is judged to be attached to the vehicle when no portable device IDs are stored in the replacement lock controller.

11. The method according to claim 9, and further comprising:

authenticating the replacement lock controller by the auxiliary lock unit before providing the portable device IDs and lock controller ID to the replacement lock controller.

12. The method according to claim 11, and further comprising:

encoding the portable device IDs and lock controller ID provided by the auxiliary lock unit to the replacement lock controller.

13. The method according to claim 9, and further comprising:

transmitting the lock controller ID from the replacement lock controller to the identified portable devices.

14. The method according to claim 9, and further comprising the step of:

indicating with an indicator light whether ID information has been successfully registered in the replacement lock controller.

15. The method according to claim 9, and further comprising:

after a predetermined timing renewing the backup data stored in the auxiliary lock unit by overwriting the portable device IDs stored in the auxiliary lock unit when they do not coincide with the portable device IDs stored in the replacement lock controller.

* * * * *